US012704942B1

(12) United States Patent
Sirmorya et al.

(10) Patent No.: US 12,704,942 B1
(45) Date of Patent: Aug. 11, 2026

(54) MAPPING CONTENT TO INTERESTS FOR ITEMS PROVIDED VIA A NETWORK RESOURCE

(71) Applicant: Amazon Technologies, Inc., Seattle, WA (US)

(72) Inventors: Ankit Sirmorya, Bothell, WA (US); Joseph Michael Pontone, Jersey City, NJ (US); Sanjeev Jain, Redmond, WA (US); Sneha Endait, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 18/206,697

(22) Filed: Jun. 7, 2023

(51) Int. Cl.

| | |
|---|---|
| ***G06F 3/0483*** | (2013.01) |
| ***G06F 3/04842*** | (2022.01) |
| ***G06F 9/451*** | (2018.01) |
| ***G06F 16/2457*** | (2019.01) |
| ***G06F 16/9535*** | (2019.01) |
| ***G06F 40/134*** | (2020.01) |
| ***G06V 10/764*** | (2022.01) |
| *G06Q 30/0601* | (2023.01) |

(52) U.S. Cl.
CPC ........ *G06F 3/0483* (2013.01); *G06F 3/04842* (2013.01); *G06F 9/451* (2018.02); *G06F 16/24578* (2019.01); *G06F 16/9535* (2019.01); *G06F 40/134* (2020.01); *G06V 10/764* (2022.01); *G06Q 30/0631* (2013.01); *G06V 2201/10* (2022.01)

(58) Field of Classification Search
CPC .... G06F 3/0483; G06F 9/451; G06F 16/9535; G06F 16/24578; G06F 40/134; G06F 3/04842; G06V 10/764; G06V 2201/10; G06Q 30/0631
See application file for complete search history.

(56) References Cited

U.S. PATENT DOCUMENTS 8,136,028 B1 * 3/2012 Loeb .................. G06Q 30/0241 715/201
8,918,411 B1 * 12/2014 Latif .................. G06F 16/9535 707/790
9,256,807 B1 * 2/2016 Shlens .................. G06F 16/739
10,185,898 B1 * 1/2019 Folkens ................. G06V 20/20
10,346,901 B1 * 7/2019 Serbanescu ........ G06Q 30/0643
11,037,071 B1 * 6/2021 Tekiela ................ G06V 10/764
(Continued)

*Primary Examiner* — Patrick F Riegler
(74) *Attorney, Agent, or Firm* — Kilpatrick Townsend & Stockton LLP

(57) ABSTRACT

Techniques described herein relate to mapping content to interests for items provided via a network document. In an example, a computer system includes, in code of a first network document that presents media content, a link to a second network document that presents information about an interest. The first link is included in the code based on an association between the media content and the interest. The computer system sends, to a user device, the code causing the user device to present the first network document and the first link. The computer system receives, from the user device, a request for the second network document and sends, to the user device, code of the second network document including a second link to a third network document that presents information about an item. The second link is included in the code based on an association between the item and the interest.

20 Claims, 11 Drawing Sheets

(56) References Cited

U.S. PATENT DOCUMENTS 11,170,424 B1* 11/2021 Lee ..................... G06F 16/9532
11,210,730 B1* 12/2021 Woodyard ........... G07G 1/0063
2010/0153848 A1* 6/2010 Saha ................... G06F 16/9562 709/219
2010/0154007 A1* 6/2010 Touboul ................. G06Q 30/02 725/115
2010/0295774 A1* 11/2010 Hennessey .............. G06F 3/013 382/103
2010/0333124 A1* 12/2010 Folgner .................. H04H 60/33 386/E5.003
2012/0023131 A1* 1/2012 Downey .............. H04N 21/812 707/769
2012/0066073 A1* 3/2012 Dilip .................. G06Q 30/0269 709/204
2013/0125156 A1* 5/2013 Shah .................. H04N 21/8153 725/14
2014/0168205 A1* 6/2014 Naveh ..................... G06T 13/20 345/419
2014/0278998 A1* 9/2014 Systrom ............. G06Q 30/0277 705/14.57
2015/0058079 A1* 2/2015 Freund .................. G06Q 50/01 705/7.31
2015/0178777 A1* 6/2015 Jing ................... G06Q 30/0269 705/14.57
2015/0178786 A1* 6/2015 Claessens .......... G06Q 30/0277 705/14.66
2015/0234813 A1* 8/2015 Knapp .................... G06F 16/14 707/722
2016/0162971 A1* 6/2016 Peterson ............ G06Q 30/0627 705/26.63
2016/0350868 A1* 12/2016 Votaw ................. G06F 16/9537
2016/0371634 A1* 12/2016 Kumar ................. G06V 10/462
2016/0379283 A1* 12/2016 Balasubramanian ........................ G06Q 30/0603 705/26.7
2017/0103072 A1* 4/2017 Yuen ................... G06F 16/5846
2017/0295414 A1* 10/2017 Murray ............ H04N 21/85406
2018/0107685 A1* 4/2018 Kale ...................... G06V 10/82
2018/0143756 A1* 5/2018 Mildrew ............... G06T 19/003
2018/0276495 A1* 9/2018 Yu .......................... G06V 20/20
2019/0080207 A1* 3/2019 Chang ................. G06F 16/5838
2020/0177688 A1* 6/2020 Fu ......................... G06F 16/535
2020/0357024 A1* 11/2020 Blaikie, III ........ G06Q 30/0269
2021/0012391 A1* 1/2021 Unnikrishnan ........ G06N 20/00
2021/0089539 A1* 3/2021 Li ...................... G06Q 30/0201
2021/0319501 A1* 10/2021 Dollens ................... G06T 11/00
2022/0012789 A1* 1/2022 Mathis .................... G06F 16/73
2022/0092071 A1* 3/2022 McIntosh .............. G06F 16/532
2022/0207274 A1* 6/2022 Folkens ................. G06V 20/47
2022/0262008 A1* 8/2022 Kidd ..................... G06F 18/214
2022/0309542 A1* 9/2022 Blaikie, III ........ G06Q 30/0261
2022/0335495 A1* 10/2022 Motes .................... G06Q 50/01
2023/0011114 A1* 1/2023 Guy .................... G06F 11/3409
2023/0097083 A1* 3/2023 Perreault ................ G06Q 20/12 705/27.1
2023/0135254 A1* 5/2023 Bakhchevan ...... G06Q 30/0271 725/12
2023/0351654 A1* 11/2023 Wright ................... G06V 10/82
2024/0037154 A1* 2/2024 Baek ..................... G06F 16/906
2024/0212371 A1* 6/2024 Patil ..................... G06V 10/776
2024/0256592 A1* 8/2024 O'Neill .................. G06V 30/10

* cited by examiner

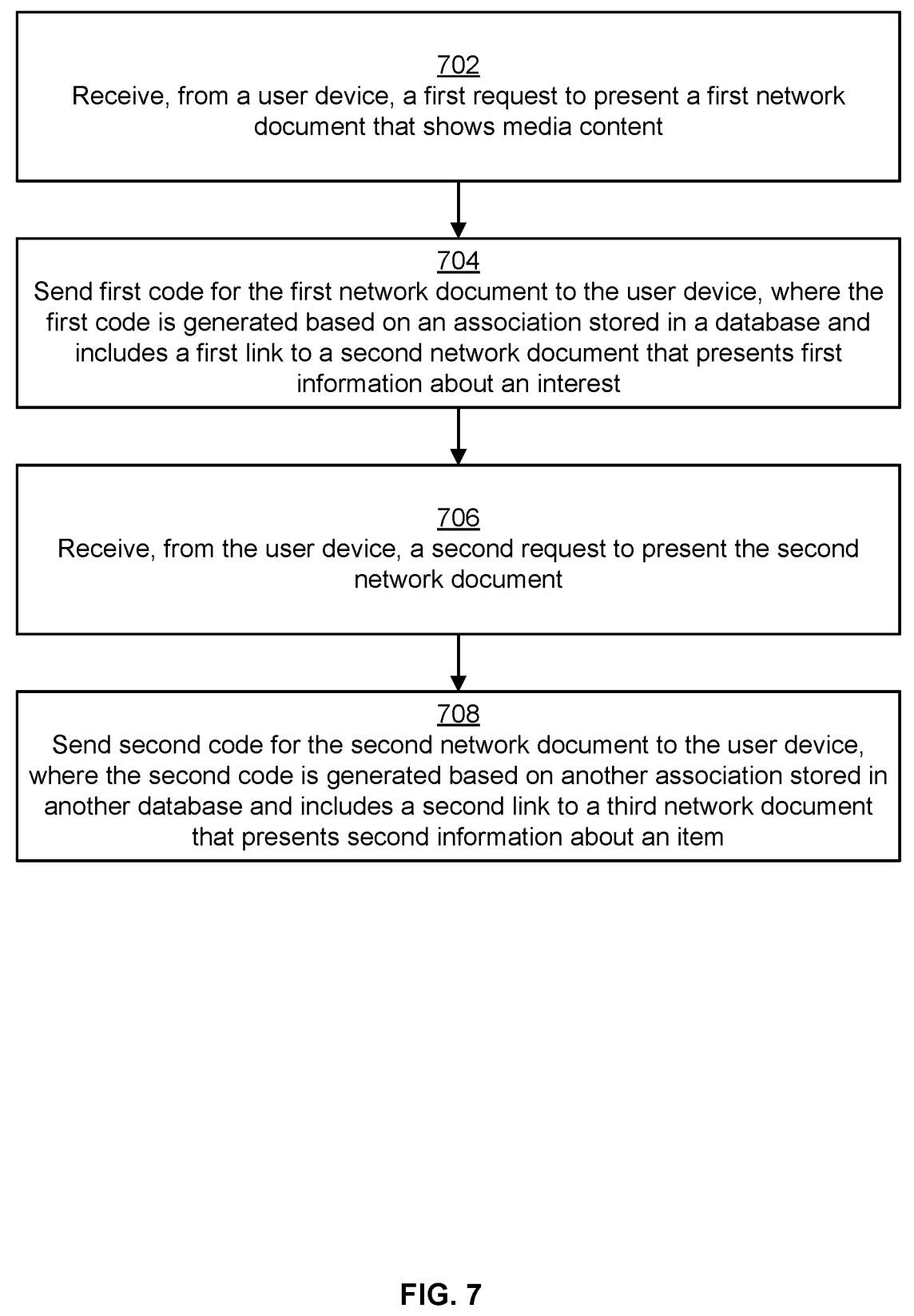

702
Receive, from a user device, a first request to present a first network document that shows media content 704
Send first code for the first network document to the user device, where the first code is generated based on an association stored in a database and includes a first link to a second network document that presents first information about an interest 706
Receive, from the user device, a second request to present the second network document 708
Send second code for the second network document to the user device, where the second code is generated based on another association stored in another database and includes a second link to a third network document that presents second information about an item

FIG. 7

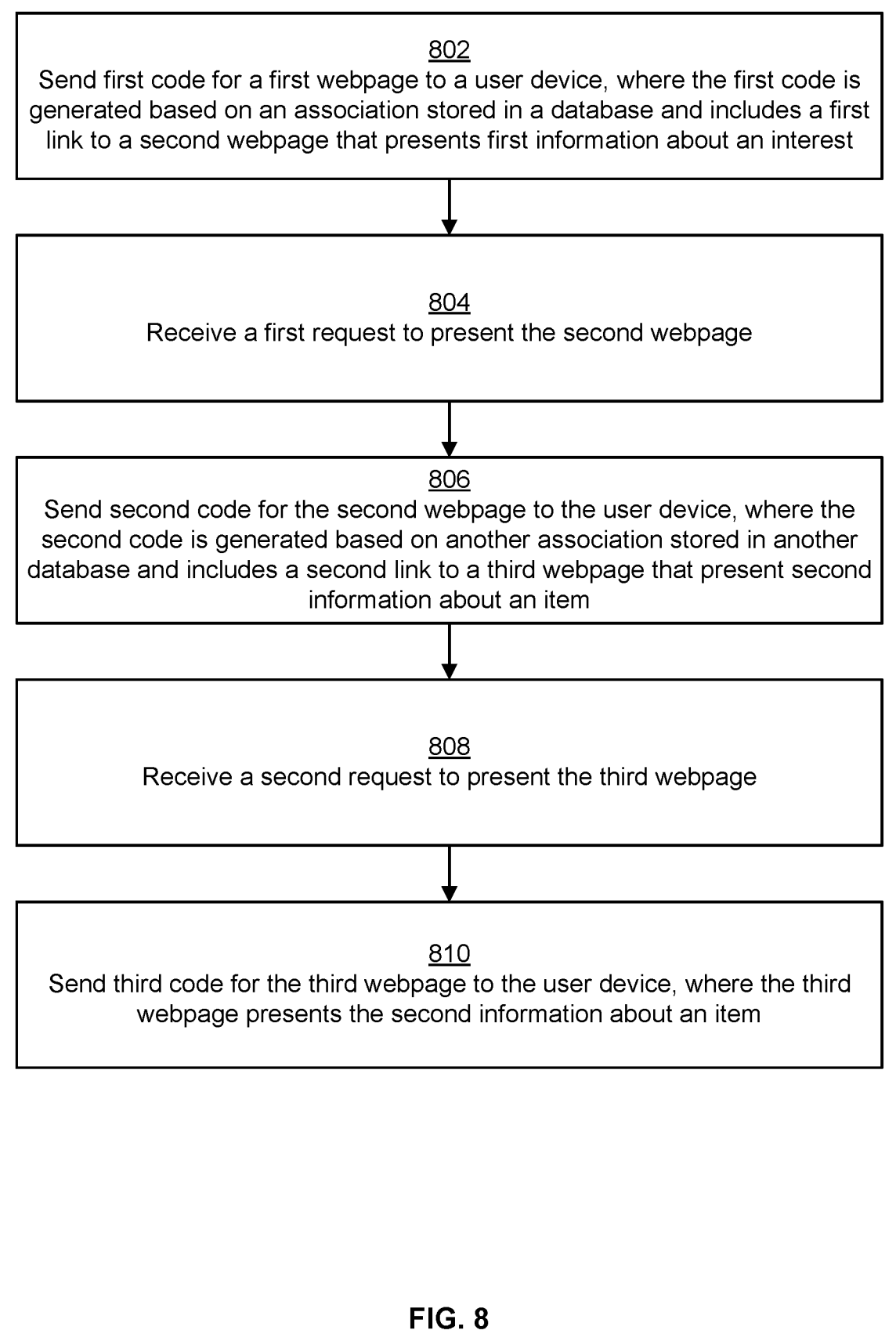

802
Send first code for a first webpage to a user device, where the first code is generated based on an association stored in a database and includes a first link to a second webpage that presents first information about an interest 804
Receive a first request to present the second webpage 806
Send second code for the second webpage to the user device, where the second code is generated based on another association stored in another database and includes a second link to a third webpage that present second information about an item 808
Receive a second request to present the third webpage 810
Send third code for the third webpage to the user device, where the third webpage presents the second information about an item

FIG. 8

MAPPING CONTENT TO INTERESTS FOR ITEMS PROVIDED VIA A NETWORK RESOURCE

BACKGROUND

Different devices are available for presenting information to users. The information can be organized in an arrangement of graphical user interface (GUI) elements. Content can be inserted in a webpage of a website upon a request of a user device for the web page. Different content types are possible, including a recommendation about an item that may be acquired from the website.

BRIEF DESCRIPTION OF THE DRAWINGS

Various embodiments in accordance with the present disclosure will be described with reference to the drawings, in which:

FIG. 1 illustrates an example of webpages of a website presenting content and items based on content-to-interest mappings, in accordance with an embodiment of the disclosure;

FIG. 7 illustrates an example of a flow for generating network documents based on associations between content and interests, according to an embodiment of the present disclosure;

FIG. 8 illustrates an example of a flow for generating webpages based on associations between content, interests, and items, according to an embodiment of the present disclosure;

DETAILED DESCRIPTION

Figure 1:
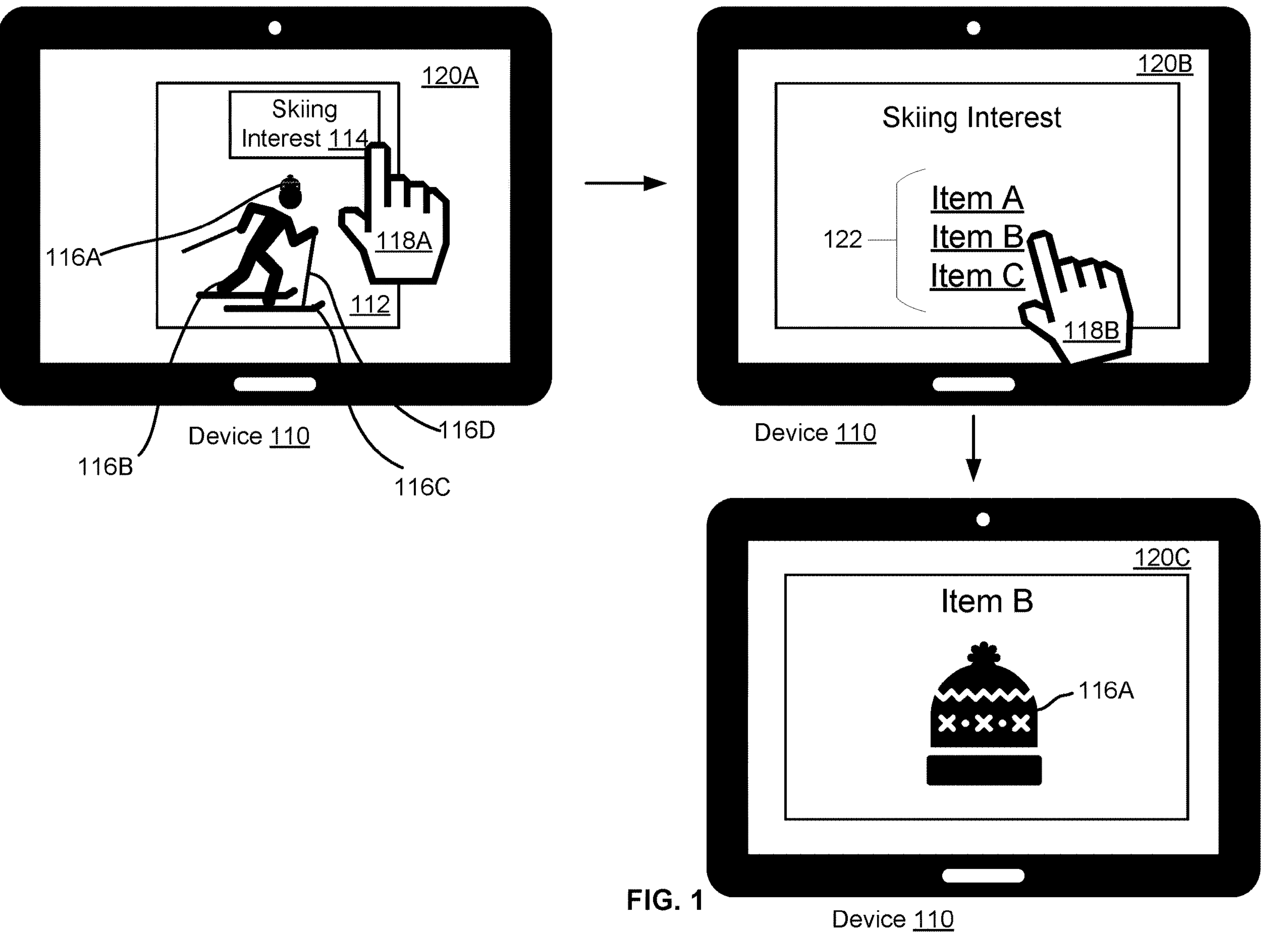
FIG. 1 illustrates

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, mapping content to interests for items provided by a network resource. In an example, a computer system can receive media content (e.g., an image or video) showing items that are available from a website. Using metadata that identifies the items in the media content, the computer system can determine an interest that the item is associated with. Then, using the interest and a relevancy score between the interest and an item category associated with the interest, the computer system can determine an association between the media content and the interest, which can be stored. Once the association is stored, it can be used to generate code for webpages of the website. For instance, the association may be used to provide item recommendations in a webpage or to provide media content presentations in a webpage.

To illustrate, consider a user operating a user device to browse a website of an online retailer. The website includes an influencer webpage, where a user can see images and videos of people wearing and using items that are available from the online retailer. For instance, an image of a person fishing may be included on the influencer page. The image can include an interest tag indicating an interest that is associated with the image. For instance, the image can include a "fishing" interest tag. The interest tag can be generated based on a determined association between the image and the "fishing" interest. The user may select the tag and be presented another webpage of the website with information about the "fishing" interest. For instance, the information may include items (e.g., fishing rod, lifejacket, fishing hat, etc.) that are available from the online retailer that are associated with the "fishing" interest. The user can further select an item to be presented another webpage with information about the item.

Embodiments of the present disclosure provide various technological advantages. For example, by storing item-to-interest and content-to-interest associations, both media content and items may be presented by the same website. Navigation between webpages of the website can be improved based on such associations. In particular, a webpage related to an item can be navigated thereto from a webpage showing an image (or other type of media) related to the item (but not the item itself) via an interest, or vice versa. Such navigation can improve the overall website surfing or browsing experience and avoid the need to navigate to many webpages or submit many searches on the website. Thus, network compute associated with browsing content is also reduced.

Although aspects herein are described with respect to websites and webpages for clarity, embodiments of the present disclosure generally relate to network resources and network documents. A website is an example of a network resource, whereas a webpage is an example of a network document. In this use case of a website and web pages, the network resource includes a collection of network documents and related underlying computing infrastructure that enables the hosting of the network documents on a set of web servers and the browsing, searching, searching, and/or downloading from the set of server servers of such network documents to user devices executing web browsers. In an example, a network resource enables the browsing, searching, searching, and/or downloading of network documents using other technologies, such as mobile application technologies. Here, a mobile application (e.g., other than a web browser) can execute on a user device to access, via an application programming interface (API) call, a page (e.g., an example of a network document) from a server (which need not be a web server), where the server can store a set of pages that represent a front end of the network resource. In both of these examples, a network document can be downloaded to a user device by sending code (e.g., HTML code) of the network document to the user device. The code can be dynamically generated upon a request from the user device. For example, a network resource may be a mobile application that runs on a device.

FIG. 1 illustrates an example of webpages of a website presenting content and items based on content-to-interest mappings, in accordance with an embodiment of the disclosure. A device 110 presents the website on a display. The website may be an online marketplace to which a user can navigate to using the device 110 to browse and purchase items. Although the device 110 in FIG. 1 is illustrated as being a tablet, the device 110 may be any suitable user device such as a smartphone, a laptop, a desktop computer, etc.

In an example, a user may use the device 110 to request that a webpage 120A that is part of the website be presented. The webpage 120A can show media content, such as an image, a collection of images, a video, and the like. In FIG. 1, the media content is an image 112 showing a person skiing. The user may click on the image 112 in another webpage to request that the webpage 120A be presented. Code for the webpage 120A can then be sent to the device 110. The webpage 120A may be a review page or an influencer paging showing the image 112 and other media content posted by various people with items that can be obtained from the website. The webpage 120A includes a tag 114 of an interest associated with the image 112. For instance, the tag 114 is labeled as "Skiing Interest", indicating that the image 112 is associated with an interest of "skiing". The tag 114 can be a selectable graphical user interface (GUI) element that is presented over a portion of the image 112. The tag 114 in FIG. 1 is presented over a top right portion of the image 112, but the tag 114 may alternatively be over a top left portion, a bottom right portion, a bottom left portion, or any other portion of the image 112.

In addition to the tag 114, the image 112 includes items 116A-116D that are available from the website. Item 116A is a winter hat, item 116B is snow pants, item 116C is skis, and item 116D is ski poles. The device 110 may receive a request 118A to present another webpage 120B. The request 118A can be a selection of the selectable GUI element of the tag 114. Upon receiving the request 118A, code of the webpage 120B is sent to the device 110. The webpage 120B presents information 122 about the interest of the image 112. So, in FIG. 1, the webpage 120B is illustrated as presenting information 122 about the "skiing" interest. The information 122 may be links to items that are associated with the "skiing" interest, such as the items 116A-D that were presented on webpage 120A. Links to additional items that are also available from the website and associated with the "skiing" interest may be presented by the webpage 120B. For instance, a link to a ski jacket or a thermal shirt may also be presented.

The webpage 120B can show various content. Some of the content can include links to item webpages and information about items associated with the interest. Other content can include other media content associated with the interest. For instance, a video about skiing and different skiing items may be shown. The video itself can be tagged with items shown in the video or an additional interest.

The user can select a link in the information 122 to visit a webpage about the corresponding item. In an example, the device 110 may receive a request 118B to present webpage 120C. The request 118B can be a selection of the link for item B. Upon receiving the request 118B, code of the webpage 120C is sent to the device 110. The webpage 120C presents information about item B. In FIG. 1, item B corresponds to item 116B that was presented in the image 112. So, the webpage 120C is illustrated as presenting information about the winter hat. So, within a single website, a user is able to browse content associated with interests, view information about a selected interest, and items associated with the interest.

Figure 2:
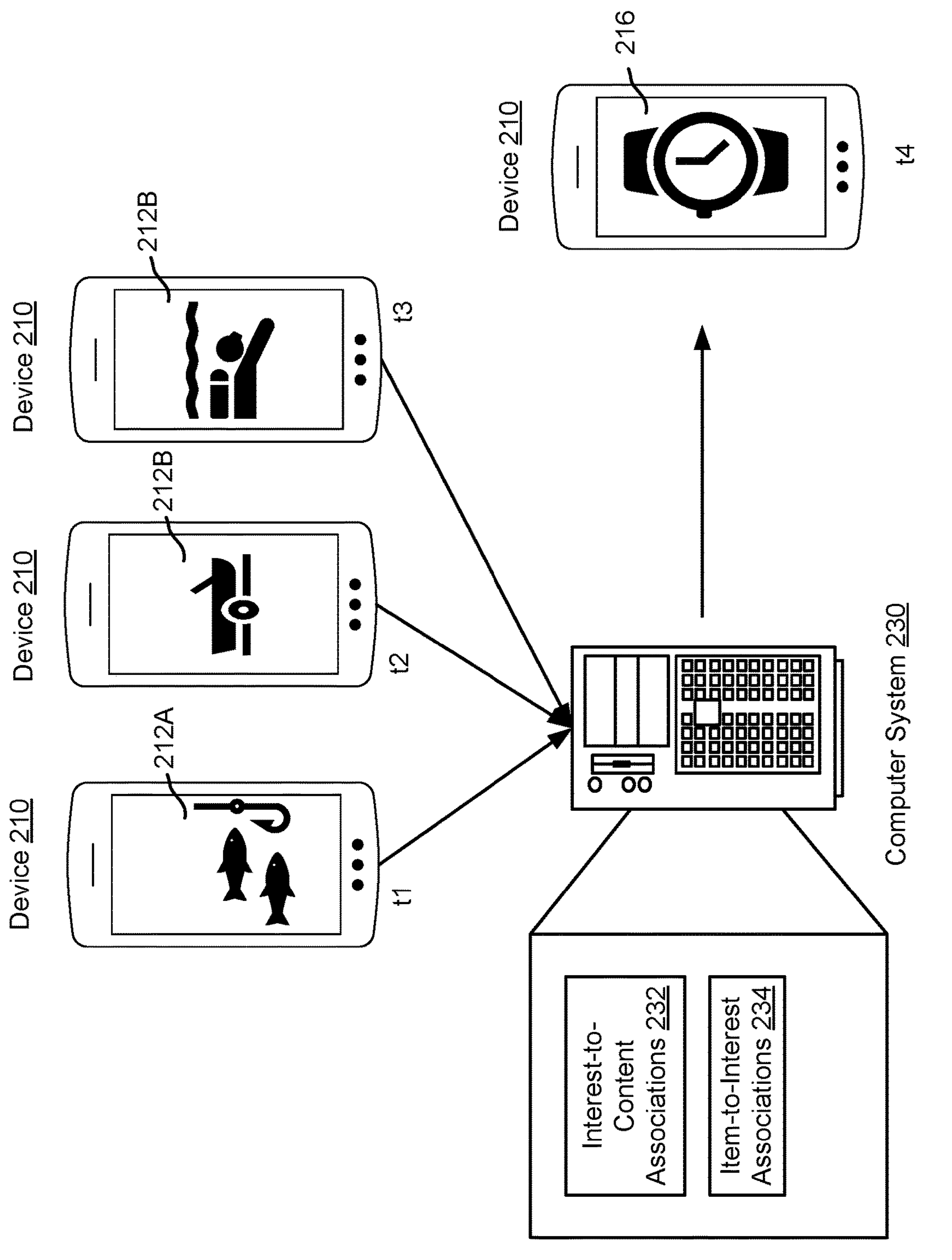
FIG. 2 illustrates an example of a website presenting items based on content-to-interest mappings, in accordance with an embodiment of the disclosure.

FIG. 2 illustrates an example of a website presenting items based on content-to-interest mappings, in accordance with an embodiment of the disclosure. A device 210 presents the website on a display. The website may be an online marketplace to which a user can navigate to using the device 210 to browse and purchase items. Over time, a computer system 230 that sends code for webpages of the website to the device 210 may receive browsing history of a user using the device 210.

In an example, the computer system 230 may determine a user account that is associated with the device 210. For instance, a user may login to the user account on the device 210. At different points in time (referred to herein as "ti"), the user may browse content related to a particular interest. For example, at t1 the device 210 presented image 212A showing fishing, at t2 the device 210 presented image 212B showing a boat, and at t3 the device 210 presented image 212C showing someone scuba diving. The computer system 230 can receive the browsing history from t1, t2, and t3 and determine an interest that is associated with the images 212A-212C. To do this, the computer system 230 may store or access interest-to-content associations 232. A piece of content (e.g., each of the images 212A-212C) may be associated with one or more interests. For instance, each of the images 212A-212C may be associated with a "water sports" interest in the interest-to-content associations 232. Upon determining that each of the images 212A-212C is associated with the "water sports" interest, the computer system 230 can associate the user account with the "water sports" interest.

The device 210 can then present items that are recommended to the user based on the association between the user account and the "water sports" interest. For example, the computer system 230 may send code for a webpage of the website to the device that presents a recommendation about an item 216. The item 216 can be associated with the "water sports" interest and can be determined based on item-to-interest associations 234 stored by the computer system 230. As illustrated, the item 216 may be a waterproof watch. The item 216 may be presented in the webpage along with another item that was requested to be presented by the user.

Figure 3:
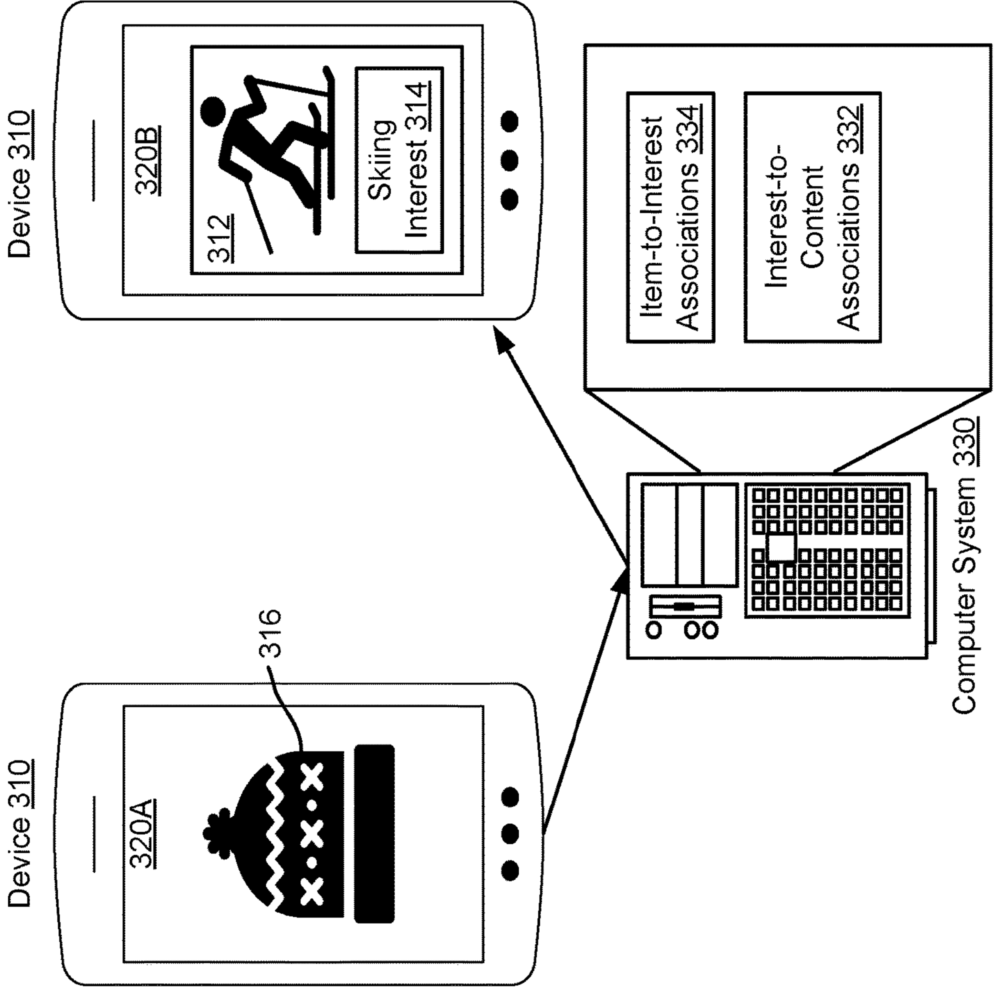
FIG. 3 illustrates an example of presenting content based on content-to-interest mappings, in accordance with an embodiment of the disclosure.

FIG. 3 illustrates an example of presenting content based on content-to-interest mappings, in accordance with an embodiment of the disclosure. A device 310 presents the website on a display. The website may be an online marketplace to which a user can navigate to using the device 310 to browse and purchase items.

In an example, a user may use the device 310 to request that a webpage 320A that is part of the website be presented. The webpage 320A can show an item 316 that is available from the website. In FIG. 3, the item 316 is a winter hat. Based on the user browsing for the item 316, the computer system 330 can cause media content that is related to a similar interest as the winter hat to be presented in a webpage of the website. For instance, the computer system 330 can include item-to-interest associations 334 that indicate that the item 316 is associated with a "skiing" interest.

Based on this determination, the computer system 330 can use interest-to-content associations 332 to determine media content that is associated with the "skiing" interest. Code for a webpage 320B including image 312 that is associated with the "skiing" interest can then be sent to the device 310. The webpage 320B may be the same or different from webpage 320A. The webpage 320A can include a tag 314 indicating that the image 312 is associated with the "skiing" interest. The tag 314 can be a selectable GUI element that is presented over a portion of the image 312. If the user selects the tag 314, the computer system 320 may send code for another webpage of the website to the device 310 that presents information about the "skiing" interest.

Figure 4:
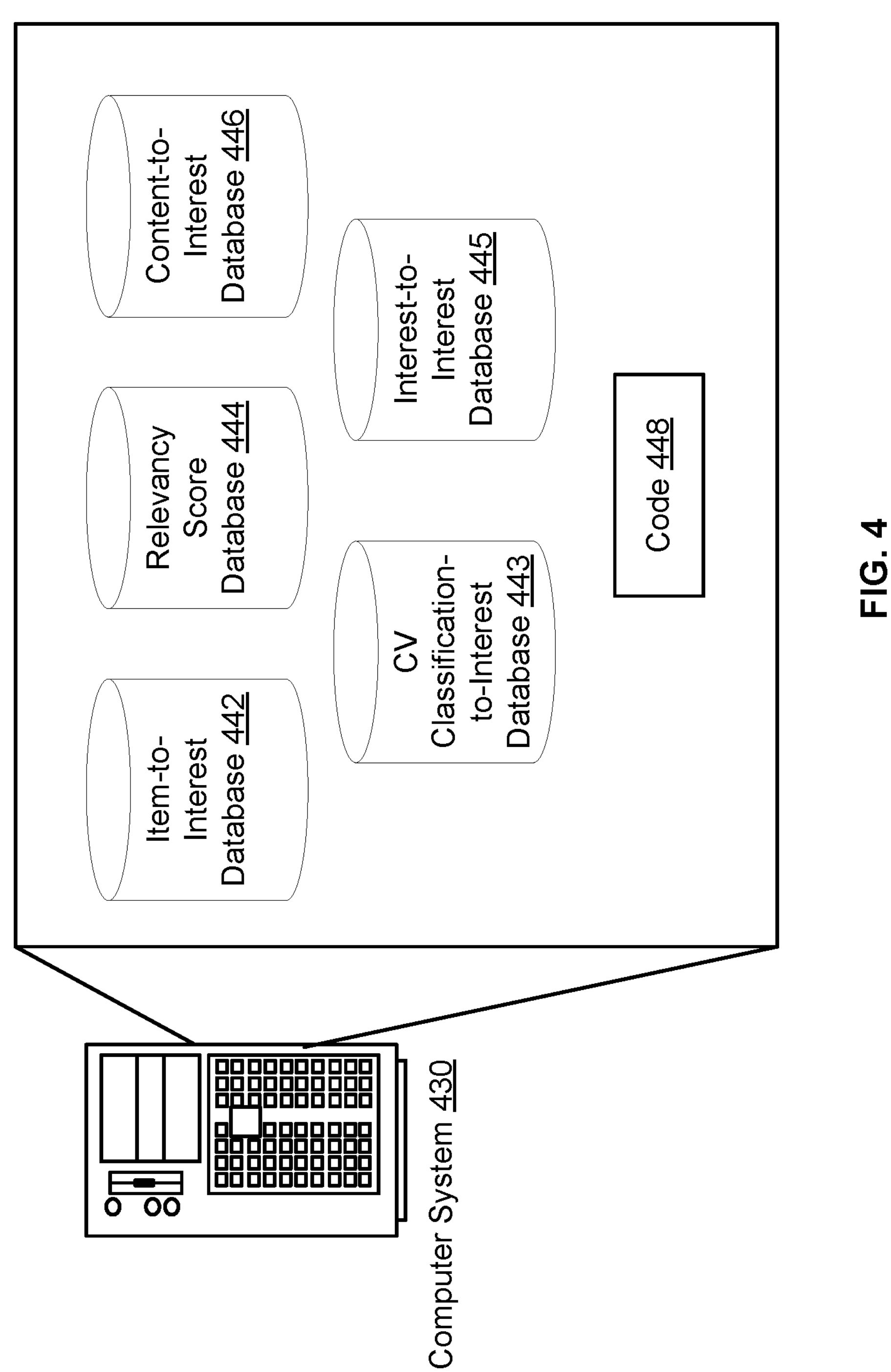
FIG. 4 illustrates components of a computer system that manages a mapping between content and interests, in accordance with an embodiment of the disclosure.

FIG. 4 illustrates components of a computer system that manages a mapping between content and interests, in accordance with an embodiment of the disclosure. The computer system 430 may receive media content (e.g., images and videos) that show items that are available from a website. The computer system 430 can also receive metadata associated with each media content with item identifiers that correspond to the items. So, if an image includes a person holding a fishing pole that is available from the website, the metadata can include an item identifier that is associated with the fishing pole.

In an example, the computer system 430 can query an item-to-interest database 442 that stores associations between items and interests to determine a first association between items in the media content and interests. For the fishing pole shown in the image, the query can use the item identifier of the fishing pole from the metadata. Based on the query of the item-to-interest database 442, the computer system 430 can determine that the image is associated with a "fishing" interest. The computer system 430 can then query a relevancy score database 444 that stores interest and item category relevancy scores to determine a relevancy associated with an interest and an item category to which an item belongs. So, based on the query of the relevancy score database 444, the computer system 430 can determine the relevancy score between the "fishing" interest and an item category of "fishing equipment" to which the fishing pole belongs.

The computer system 430 can generate a second association between media content and interests based on the first association and the relevancy score. To generate the second association, the computer system 430 may determine a corresponding interest for each item included in media content to generate a set of candidate interests. For instance, the image of the person holding the fishing pole may also include a tackle box and a fishing shirt. So, an interest may be determined for the tackle box and the fishing shirt individually based on the item-to-interest database 442. In addition, a corresponding relevancy score for each candidate interest can be determined based on the relevancy score database 444. The computer system 430 can then rank the candidate interests based on the relevancy scores. For instance, the "fishing" interest may have a relevancy score of ninety for the fishing pole and eighty for the tackle box, and a "outdoors" interest for the fishing shirt may have a relevancy score of sixty. The computer system 430 can generate a normalized score for each interest based on the relevancy scores associated with the interest, a number of items identified in the metadata and are associated with the interest, and a total number of items identified in the metadata. So, since two relevancy scores are associated with the "fishing" interest, the normalized score for the "fishing" interest may be 0.59 and the normalized score for the "outdoors" interest may be 0.41. So, the "fishing" interest may be ranked higher than the "outdoors" interest since the normalized score for the "fishing" interest is higher than the "outdoors" interest. The computer system 430 can then select the "fishing" interest as being associated with the image based on the ranking. The second association is generated based on the "fishing" interest being selected, and the computer system 430 can store the second association in a content-to-interest database 446.

The computer system 430 can also generate and store a computer vision (CV) classification-to-interest database 443 that stores associations between CV classifications and interests and an interest-to-interest database 445 that stores associations between various interests. Each of these databases is described in more detail herein below with respect to FIG. 5.

Based on the item-to-interest database 442, the CV classification-to-interest database 443, the relevancy score database 444, the interest-to-interest database 445, and/or the content-to-interest database 446, the computer system 430 can generate code 448 to insert in a webpage, as described herein above with respect to FIGS. 1-3. For instance, referring to FIG. 1, the computer system 430 determines the image 112 is being presented, looks up the content-to-interest database 446 and determines the "skiing" interest associated with the image 112, then looks up the item-to-interest database 442 to determine the item 116A that is to be presented. Referring to FIG. 2, the computer system 430 determines media content presented over time, looks up the content-to-interest database 446 to determine that the user account is associated with the "water sports" interest based on the media content, and then looks up the item-to-interest database 442 to determine the item 216 is to be presented. Referring to FIG. 3, the computer system 430 determines the item 316 is being presented, looks up the item-to-interest database 442 to determine the "skiing" interest is associated with the item 316, then looks up the content-to-interest database 446 to determine that the image 312 of the person skiing is to be presented.

Figure 5:
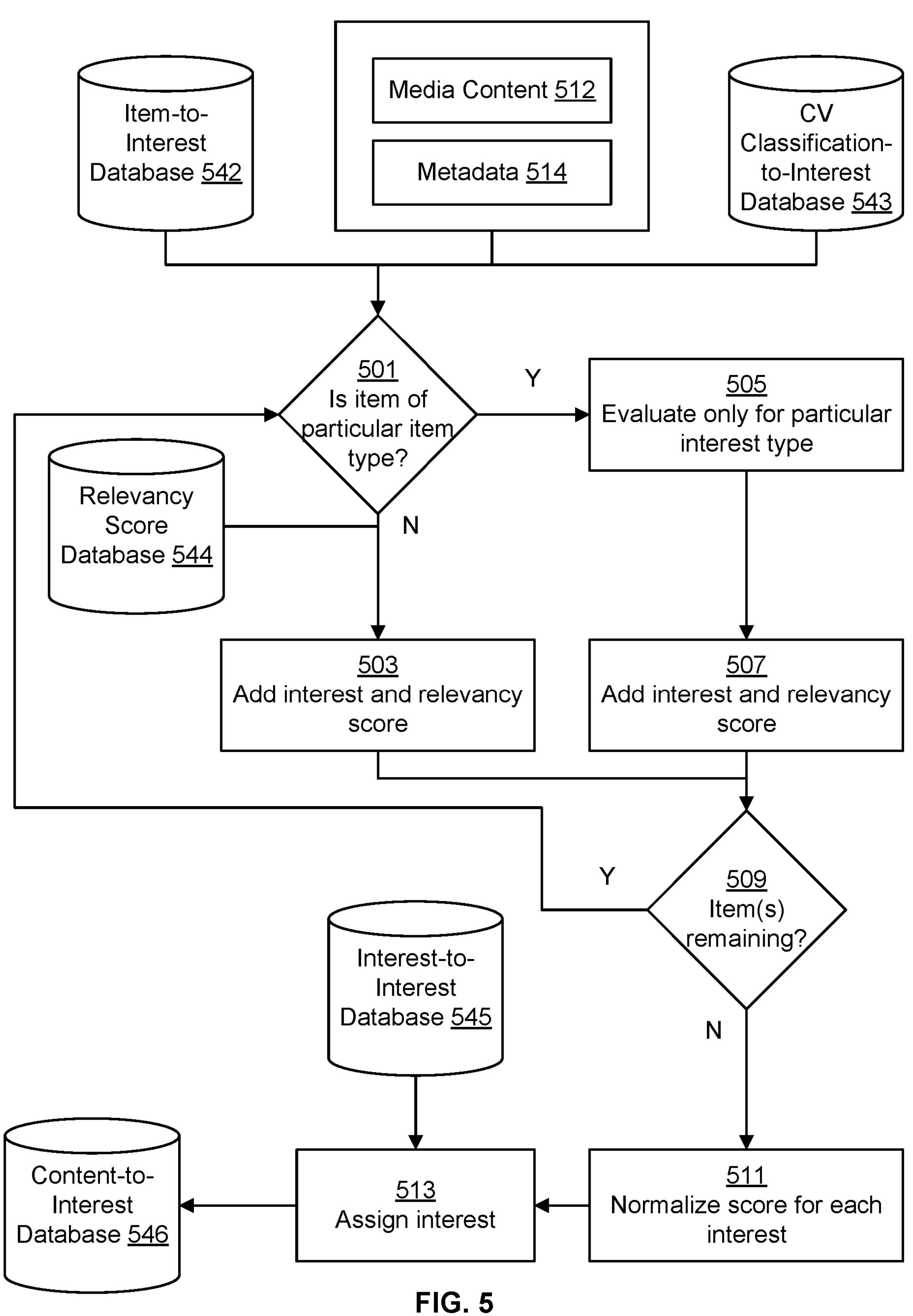
FIG. 5 illustrates an exemplary flow diagram of mapping interests to content, in accordance with an embodiment of the disclosure.

FIG. 5 illustrates an exemplary flow diagram of mapping interests to content, in accordance with an embodiment of the disclosure. A computer system (e.g., computer system 430 in FIG. 4) may perform the steps of the flow diagram. In an example, media content 512 and metadata 514 associated with the media content 512 is received. The metadata 514 may include item identifiers that each correspond to an item shown in the media content 512. Additionally, or alternatively, the metadata 514 may include annotations from which keywords describing the media content 512 can be determined. For example, the media content 512 may be an image and the metadata 514 may include a title of the image (e.g., "Sunrise Yoga").

At block 501, the computer system can determine whether an item shown in the media content 512 is of a particular item type. For example, the item may be a yoga mat and the particular item type may be clothing, so the computer system determines that the item is unassociated with the particular item type. The computer system can then proceed to block 503 and add an interest and a relevancy score to a candidate set. To do this, the computer system can query an item-to-interest database 542 that stores associations between items and interests. The query can include the item identifier or at least one of the keywords. Based on the query, the computer system determines an interest that is associated with the yoga mat. Alternative to the item identifier or the keywords being used in the query, the query may use a feature of the media content 512 that is identified by a machine learning model. The computer system can generate an input to the machine learning model based on the media content 512 or the metadata 514 and then determine an output that indicates features of the media content 512. For instance, the features may be items, scenery, an overall tone, etc. of the media content 512. Based on the query, the interest may be determined to be "yoga". The computer system can then query a relevancy score database 544 that stores interest and item category relevance scores. So, the relevancy score between a yoga mat and an item category of yoga equipment may be ninety-five. The computer system includes the item identifier and the relevancy score in a set of items and relevancy scores associated with the "yoga" interest.

In an example, the computer system may additionally or alternatively query a computer vision (CV) classification-to-interest database 543 that stores associations between CV classifications and interests. To generate the associations, CV is applied to the content to generate one or more classifications for the content based on the CV implementing feature embeddings. Then, the CV can be applied to the media content 512 to determine a classification(s) of the media content 512. The query to the CV classification-to-interest database 543 can include the classification(s), and based on the query, the computer system can determine an interest(s) associated with the media content 512.

In an example, if the computer system determines than an item shown in the media content 512 is of the particular item type at block 501, the computer system may determine that only a particular interest type is associated with the particular item type at block 505. For instance, if the item is yoga pants, the computer system can determine that they are of the particular item type of clothing. So, the computer system can determine that clothing is associated with a particular interest type of "fashion". The computer system may remove a second interest (e.g., "yoga") that is associated with the yoga pants and is of an interest type that is not "fashion". The computer system queries the item-to-interest database 542 using an item identifier of the yoga pants to determine that the interest associated with the yoga pants is "workout fashion", which is associated with the interest type of "fashion". The computer system can then query the relevancy score database 544 to determine a relevancy score between the yoga pants and an item category of yoga clothing. Since the "workout fashion" interest is of the "fashion" interest type, the computer system includes the item identifier and the relevancy score in a set of items and relevancy scores associated with the "workout fashion" interest at block 507.

At block 509, the computer system determines whether any items identified in the metadata 514 have not yet been associated with an interest. If there are remaining items, the computer system returns to block 501. Otherwise, the computer system proceeds to block 511 and normalizes a score for each interest. The computer system can additionally or alternatively generate a normalized score for each interest based on the relevancy scores and the total number of items identified by the metadata 514. For instance, the relevancy score for the "yoga" interest may be 0.56 and the relevancy score for the "workout fashion" interest may be 0.44. The computer system can generate a ranking of the interests, with the "yoga" interest ranked higher than the "workout fashion" interest based on the normalized scores. The computer system 430 can then select the "yoga" interest as being associated with the media content 512 based on the ranking. At block 513, the computer system stores an association between the media content 512 and the "yoga" interest in the content-to-interest database 546.

In an example, the computer system may additionally or alternatively determine a number of items that are identified by the metadata 514 and associated with one of the interests (e.g., "yoga" interest). For instance, the computer system may determine that ten items are identified in the metadata 514 and that nine of the items are associated with the "yoga" interest and one is associated with the "workout fashion" interest. The computer system can determine, for each interest, a ratio of the number of items for the interest and the total number of items and then select the interest that has a highest ratio. So, the computer system can select the "yoga" interest and store the association between the media content 512 and the "yoga" interest in the content-to-interest database 546. Before storing the association, the ratio may be compared to a threshold set as a percentage of the total number of all items identified by the metadata 514. For example, the threshold may be 80%, so the computer system can store the association between the "yoga" interest and the media content 512 if the number of items associated with the "yoga" interest is at least eight.

The computer system may query an interest-to-interest database 545 before storing the association of the media content 512 to an interest. The interest-to-interest database 545 stores associations between various interests, which may be used to boost or de-boost candidate interests. For instance, four interests may be found to relate to the media content 512: yoga, workout fashion, meditation, and hiking. Based on the query, the computer system can determine that the three first interests are positively related and the last interest is not. So, the computer system can boost the first three interests and de-boost the last interest during the determination of the content-to-interest association. Boosting means that the computer system is more likely to select the interest, whereas de-boosting means that the computer system is less likely to select the interest.

Although FIG. 5 illustrates using the item-to-interest database 542, the CV classification-to-interest database 543, the relevancy score database 544, and the interest-to-interest database 545 to generate the content-to-interest database 546, the inputs to generate the content-to-interest database 546 can be more generic. For instance, the inputs may be item signals, classification signals, etc. that are not specifically tied to interests. So, rather than using the flow shown in FIG. 5, the computer system may use machine learning to generate the content-to-interest associations based on the input signals.

FIGS. 6-10 illustrates example flows related to mapping content to interests for items provided by a website, according to an embodiment of the present disclosure. Some or all of the processes (or any other processes described herein, or variations, and/or combinations thereof) may be performed under the control of one or more computer systems such as the computer system 430 in FIG. 4, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
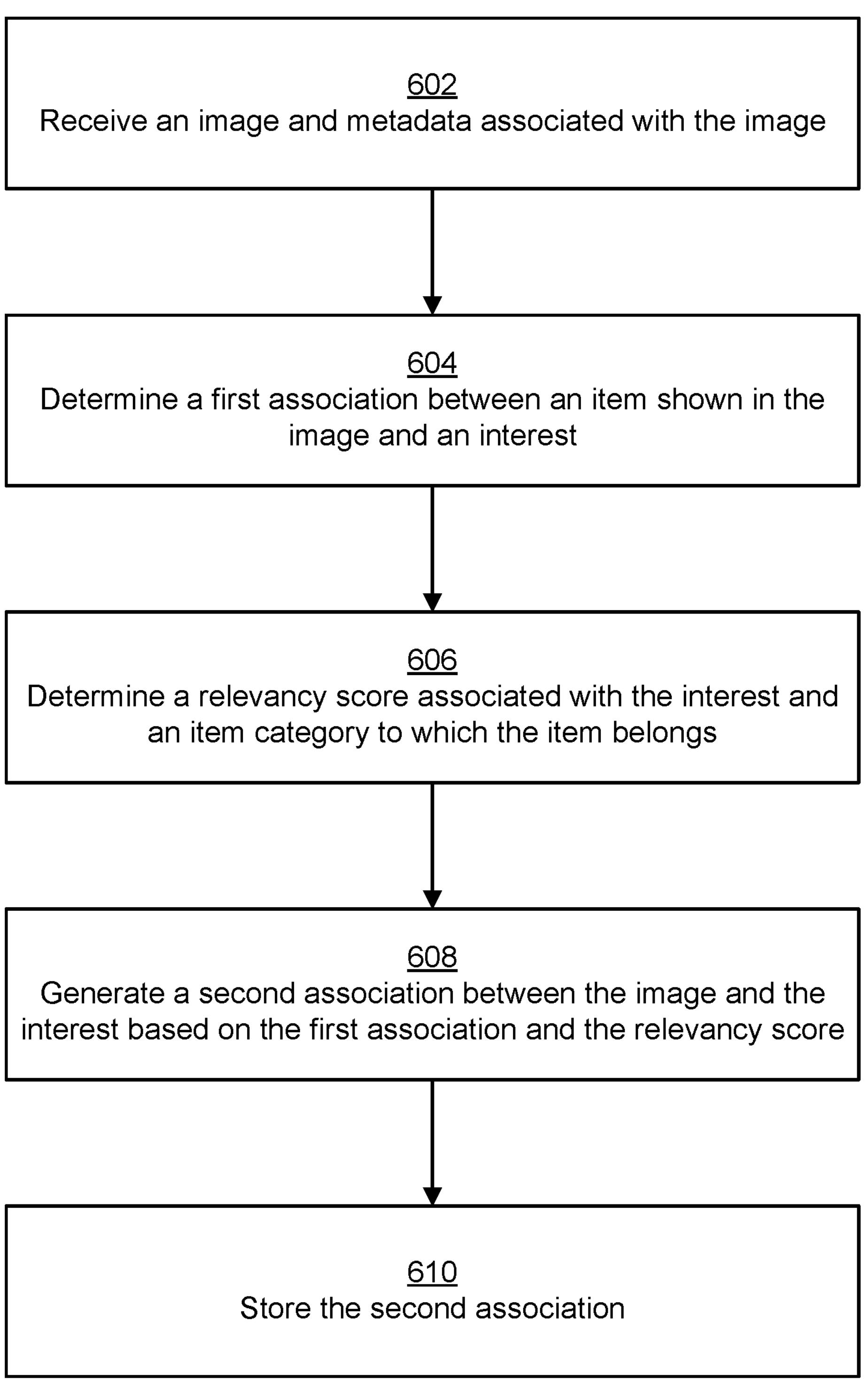
FIG. 6 illustrates an example of a flow for generating an association between content and an interest, according to an embodiment of the present disclosure.

FIG. 6 illustrates an example of a flow for generating an association between content and an interest, according to an embodiment of the present disclosure. In an example, the flow includes operation 602, where the computer system receives an image and metadata associated with the image.

The image can show items available from a website and the metadata can include item identifiers that correspond to the items.

In an example, the flow includes operation 604, where the computer system determines a first association between an item shown in the image and an interest. The computer system can query a first database that stores first associations between items and interests to determine the first association. The first query can use an item identifier from the metadata, a keyword from the metadata, or a feature of the image generated by a machine learning model.

In an example, the flow includes operation 606, where the computer system determines a relevancy score associated with the interest and an item category to which the item belongs. The computer system queries a second database that stores interest and item category relevancy scores to determine the relevancy score that is associated with the interest and an item category to which the item belongs. A higher relevancy score indicates a higher relevance between the interest and the item category.

In an example, the flow includes operation 608, where the computer system generates a second association between the image and the interest based on the first association and the relevancy score. The computer system can rank the interest and other interests determined to be associated with other items in the image based on the relevancy scores. In addition, the computer system can generate a normalized score for each interest based on the relevancy scores associated with the interest, a number of items that are identified in the metadata and are associated with the interest, and a total number of items identified in the metadata. The computer system can then select the interest with the highest normalized score as being associated with the image based on the ranking. The second association is generated based on the interest being selected.

In an example, the flow includes operation 610, where the computer system stores the second association. The second association can be stored in a third database. Based on the first database, the second database, and the third database, the computer system can generate code to insert in a webpage, as described herein above with respect to FIGS. 1-3.

FIG. 7 illustrates an example of a flow for generating network documents based on associations between content and interests, according to an embodiment of the present disclosure. In an example, the flow includes operation 702, where the computer system receives a first request to present a first network document that shows media content. A user device (e.g., device 110 in FIG. 1) may send the request to the computer system. The network document may be a webpage that is part of a network resource (e.g., a website). The media content can show items that are available from the network resource.

In an example, the flow includes operation 704, where the computer system sends the first code for the first network document to the user device. The computer system can generate the first code based on an association between the media content and an interest that is stored in a database. The first code can include a first link to a second network document that presents first information about the interest. The first link may be a selectable GUI element that is positioned at least partially over the media content.

In an example, the flow includes operation 706, where the computer system receives a second request to present the second network document from the user device. The second request may be a selection of the selectable GUI element.

In an example, the flow includes operation 708, where the computer system sends second code for the second network document to the user device. The second code is generated based on another association between the interest and an item that is stored in another database. The second code can include a second link to a third network document that presents second information about the item that is associated with the interest.

FIG. 8 illustrates an example of a flow for generating webpages based on associations between content, interests, and items, according to an embodiment of the present disclosure. In an example, the flow includes operation 802, where the computer system sends first code for a first webpage to a user device. The computer system can generate the first code based on an association between an image requested to be presented by the first webpage and an interest that is stored in a database. The first code can include a first link to a second webpage that presents first information about the interest. The first link may be a selectable GUI element that is positioned at least partially over the image. As shown in FIG. 1, the device 110 can present the webpage 120A showing image 112 that is associated with a "skiing" interest.

In an example, the flow includes operation 804, where the computer system receives a first request to present the second webpage. The first request may be a selection of the selectable GUI element, such as request 118A in FIG. 1.

In an example, the flow includes operation 806, where the computer system sends second code for the second webpage to the user device. The second code is generated based on another association between the interest and an item that is stored in another database. The second code can include a second link to a third webpage that presents second information about the item that is associated with the interest. As shown in FIG. 1, the device 110 can present the webpage 120B showing information 122 about the "skiing" interest and including links to items associated with the "skiing" interest.

In an example, the flow includes operation 808, where the computer system receives a second request to present the third webpage. The second request may be a selection of the link to the third webpage, such as request 118B in FIG. 1.

In an example, the flow includes operation 810, where the computer system sends third code for the third webpage to the user device. The third webpage presents the second information about the item. As shown in FIG. 1, the device 110 can present the webpage 120C showing information about a winter hat.

Figure 9:
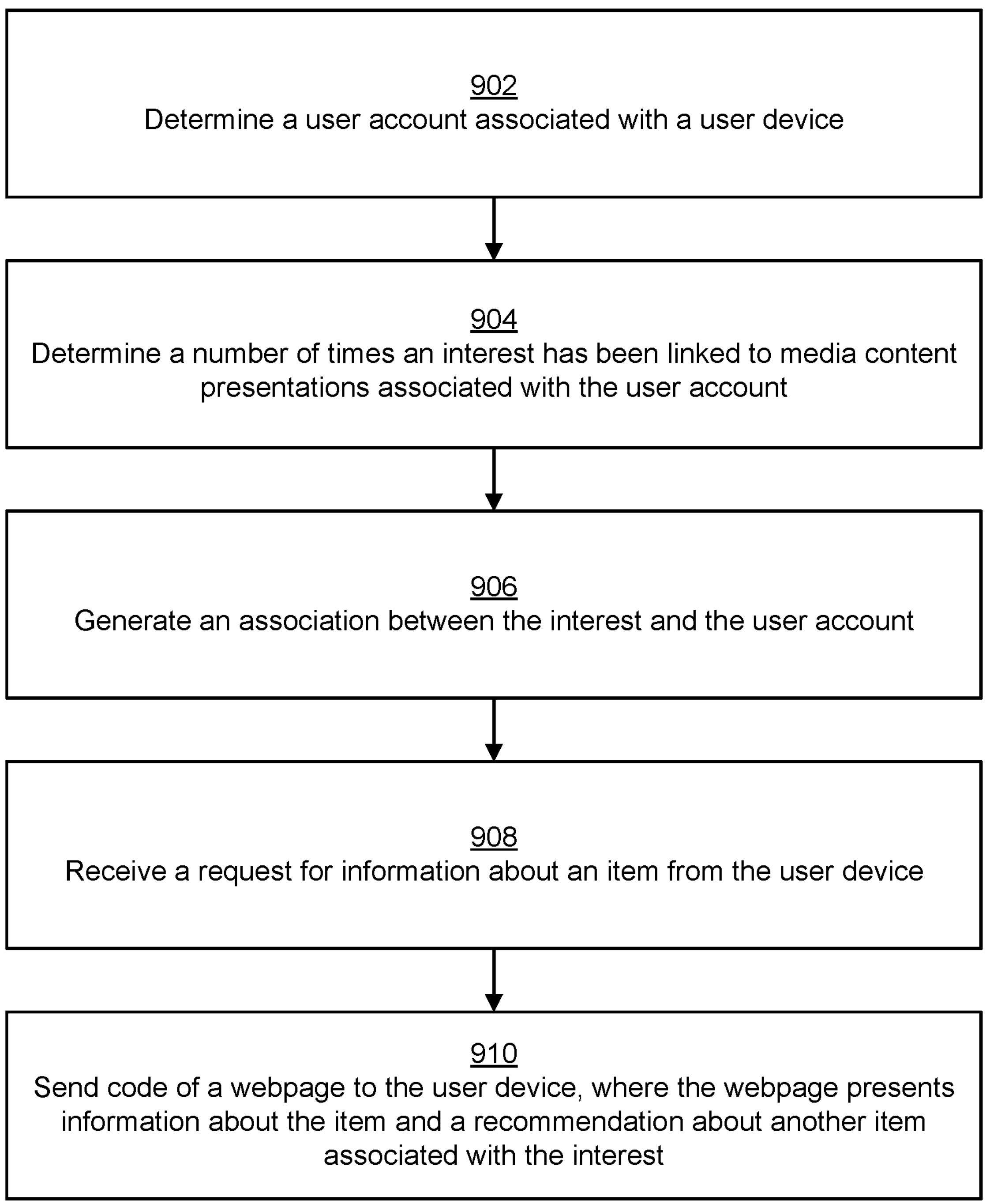
FIG. 9 illustrates an example of a flow of presenting items based on content-to-interest mappings, in accordance with an embodiment of the disclosure.

FIG. 9 illustrates an example of a flow of presenting items based on content-to-interest mappings, in accordance with an embodiment of the disclosure. In an example, the flow includes operation 902, where the computer system determines a user account associated with a user device. A user may login to the user account on the device, and the computer system can determine the association based on the login.

In an example, the flow includes operation 904, where the computer system determines a number of times an interest has been linked to media content presentations associated with the user account. For instance, the computer system may receive or evaluate a browsing history of the user device to determine the number of times media content presentations linked to a particular interest. For instance, the computer system may determine that the user account is associated with three media content presentations linked to a "swimming" interest.

In an example, the flow includes operation 906, where the computer system generates an association between the interest and the user account. The computer system may determine if the number of times is greater than a threshold (e.g., two), and then generate the association if the number of times is greater than the threshold.

In an example, the flow includes operation 908, where the computer system receives a request for information about an item from the user device. The user may select a link associated with the item to request the information.

In an example the flow includes operation 910, where the computer system sends code of a webpage to the user device. The webpage can present information about the item and a recommendation about another item associated with the interest. The computer system can generate the recommendation based on the association between the interest and the user account. So, the computer system can determine that the other item is associated with the interest and include the recommendation on the third webpage.

Figure 10:
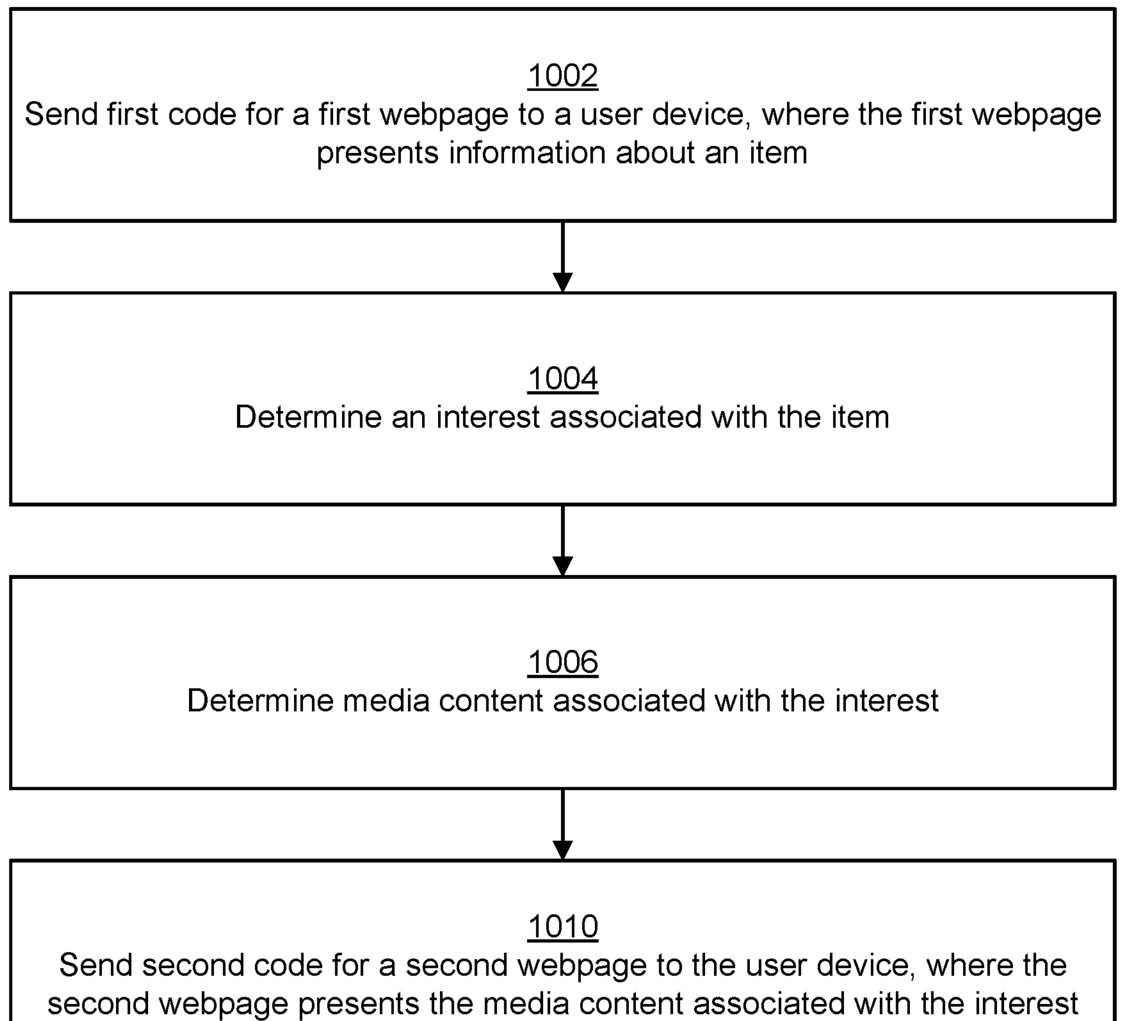
FIG. 10 illustrates an example of a flow of presenting content based on content-to-interest mappings, in accordance with an embodiment of the disclosure.

FIG. 10 illustrates an example of a flow of presenting content based on content-to-interest mappings, in accordance with an embodiment of the disclosure. In an example, the flow includes operation 1002, where the computer system sends first code for a first webpage to a user device. The first webpage can present information about an item. The first code may be generated based on a request for information about the item to be presented.

In an example, the flow includes operation 1004, where the computer system determines an interest associated with the item. The computer system can query a first database to determine the interest that is associated with the item. The first database can store associations between items and interests.

In an example, the flow includes operation 1006, where the computer system determines media content that is associated with the interest. The computer system can query a second database to determine the media content that is associated with the interest. The second database can store associations between media content and interests.

In an example, the flow includes operation 1008, where the computer system sends second code for a second webpage to the user device. The second webpage can present the media content associated with the interest, as shown in FIG. 3.

Figure 11:
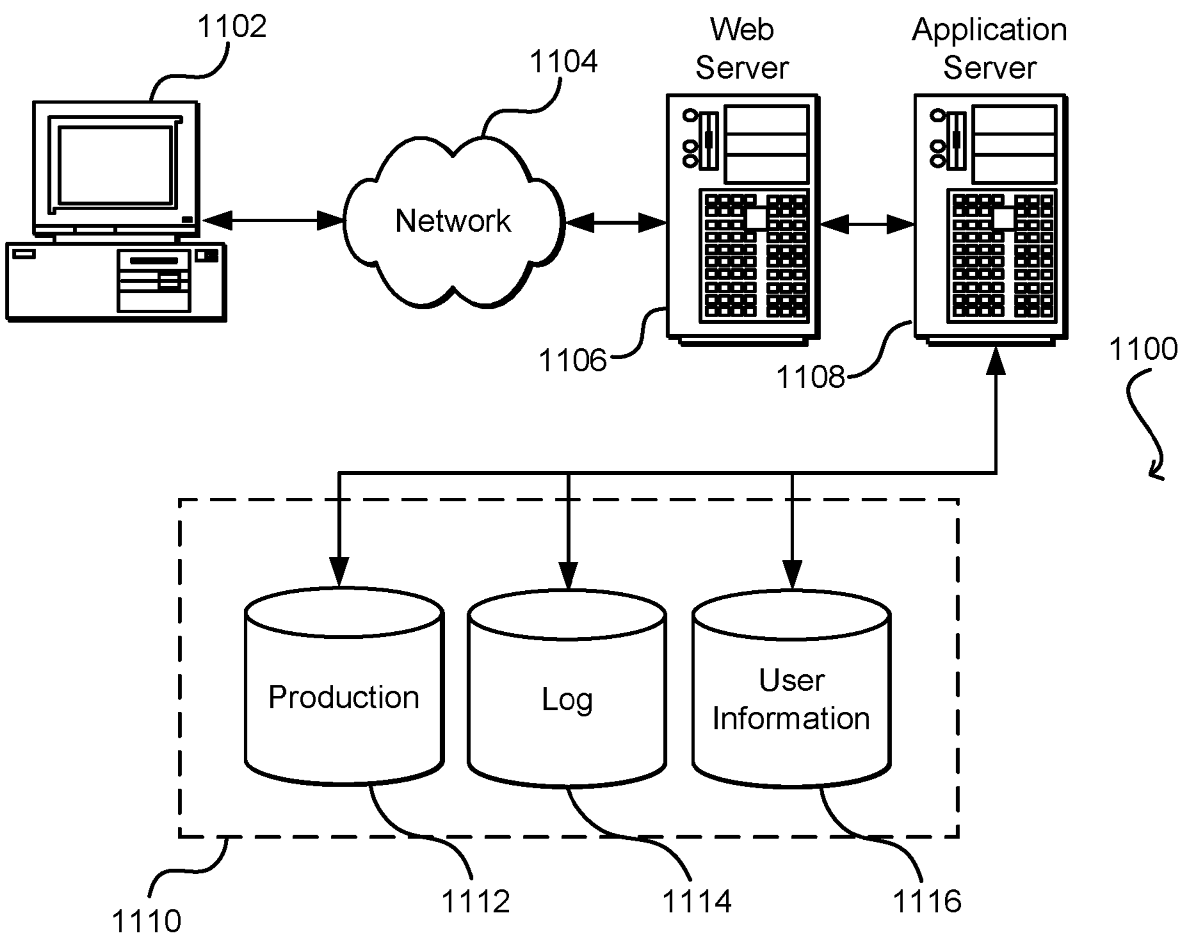
FIG. 11 illustrates aspects of an example environment for implementing aspects in accordance with various embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:

one or more processors; and one or more memory storing instructions that, upon execution by the one or more processors, configure the system to:

receive an image and metadata associated with the image, the image showing a plurality of items available from a website, the metadata including item identifiers each corresponding to one of the plurality of items;

determine, based at least in part on a first query to a first database that stores first associations between items and interests, a first association between a first item of the plurality of items and a first interest, the first query using a first item identifier from the metadata;

determine, based at least in part on a second query to a second database that stores interest and item category relevancy scores, a first relevancy score associated with the first interest and a first item category to which the first item belongs;

generate a second association between the image and the first interest based at least in part on the first association and the first relevancy score;

store the second association in a third database;

receive, from a user device, a first request to present a first webpage that shows the image, the first webpage being part of the website;

send, to the user device, first code for the first webpage, the first code generated based at least in part on the second association stored in the third database and including a first link to a second webpage that presents first information about the first interest, the first link presentable as a selectable graphical user interface (GUI) element over a portion of the image, the second webpage being part of the website;

receive, from the user device, a second request to present the second webpage, the second request received based at least in part on a selection of the selectable GUI element; and send, to the user device, second code for the second webpage, the second code generated based at least in part on the first association stored in the first database and including a second link to a third webpage that presents second information about the first item, the third webpage being part of the website.

2. The system of claim 1, wherein the one or more memory store further instructions that, upon execution by the one or more processors, configure the system to:

determine, for each one of the plurality of items and based at least in part on the first database, a corresponding interest to generate a set of candidate interests;

determine, for each candidate interest and based at least in part on the second database, a corresponding relevancy score;

generate a ranking of the candidate interests based at least in part on relevancy scores; and select the first interest based at least in part on the ranking, wherein the second association is generated based at least in part on the first interest being selected.

3. The system of claim 2, wherein the one or more memory store additional instructions that, upon execution by the one or more processors, configure the system to:

generate a normalized score for the first interest based on relevancy scores associated with the first interest, a number of items identified in the metadata and associated with the first interest, and a total number of items identified in the metadata, wherein the ranking is based at least in part on the normalized score.

4. The system of claim 1, wherein the one or more memory store further instructions that, upon execution by the one or more processors, configure the system to:

determine that the first item is of a particular item type;

determine that the particular item type can be associated with only a particular interest type;

determine that the first interest is of the particular interest type; and remove a second interest associated with the first item and being of a different interest type.

5. A computer-implemented method comprising:

including, in first code of a first network document, a first link to a second network document, the first network document presenting first media content and being part of a network resource that includes a plurality of network documents, the second network document presenting first information about a first interest and being part of the network resource, the first link included in the first code based at least in part on an automated process indicating a first association between the first media content and the first interest;

sending, to a user device, the first code causing the user device to present the first network document and a selectable option corresponding to the first link;

receiving, from the user device, a request for the second network document based at least in part on a selection of the selectable option; and sending, to the user device, second code of the second network document, the second code including a second link to a third network document, the third network document presenting second information about a first item and being part of the network resource, the second link included in the second code based at least in part on a second association between the first item and the first interest, wherein the automated process includes determining the first association between the first media content and the first interest based at least in part on (i) the second association between the first item and the first interest and (ii) a first relevancy score associated with the first interest and a first item category to which the first item belongs.

6. The computer-implemented method of claim 5 further comprising:

determining a user account associated with the user device;

determining a number of times the first interest has been linked to media content presentations associated with the user account; and generating a third association between the first interest and the user account based at least in part on the number of times.

7. The computer-implemented method of claim 6 further comprising:

receiving, from the user device, a request for information about a second item;

determining the first interest at least in part on the third association;

determining a third item that is associated with the first interest; and sending, to the user device, third code of a fourth network document in response to the request for information, the fourth network document presenting third information about the second item and a recommendation about the third item and being part of the network resource.

8. The computer-implemented method of claim 5 further comprising:

receiving, from the user device, a request for information about a second item;

determining that the second item is associated with the first interest;

determining a plurality of media contents associated with the first interest; and sending, to the user device, third code of a fourth network document in response to the request for information, the fourth network document presenting third information about the second item and at least one of the plurality of media contents and being part of the network resource.

9. The computer-implemented method of claim 5 further comprising prior to including the first link in the first code:

receiving the first media content and metadata associated with the first media content, the metadata identifying the first item and a second item as being associated with the first media content;

determining, based at least in part on a first query to a first database that stores associations between items and interests, the second association between the first item and the first interest, the first query using a first item identifier from the metadata;

determining, based at least in part on a second query to a second database that stores interest and item category relevancy scores, the first relevancy score;

generating the first association between the first media content and the first interest based at least in part on the second association and the first relevancy score; and storing the second association in a third database.

10. The computer-implemented method of claim 9 further comprising prior to including the first link in the first code:

determining that the first item is unassociated with a particular item type; and including the first item identifier and the first relevancy score in a set of items and relevancy scores associated with the first interest.

11. The computer-implemented method of claim 10 further comprising prior to including the first link in the first code:

determining that no interest has been determined based at least in part on the second item;

determining, based at least in part on a third query to the first database, a third association between the second item and the first interest, the third query using a second item identifier from the metadata;

determining, based at least in part on a fourth query to the second database, a second relevancy score associated with the first interest and a second item category to which the second item belongs; and including the second item identifier and the second relevancy score in the set of items and relevancy scores associated with the first interest.

12. The computer-implemented method of claim 11, further comprising prior to including the first link in the first code:

generating a first normalized score for the first interest based at least in part on the first relevancy score, the second relevancy score, and a total number of items identified in the metadata;

generating, based at least in part on the first normalized score of the first interest and a second normalized score of a second interest, a ranking of the first interest and the second interest, wherein the second interest is associated with at least one of a plurality of items identified in the metadata; and selecting the first interest over the second interest based at least in part on the ranking, wherein the first association is generated based at least in part on the first interest being selected.

13. One or more non-transitory computer-readable storage media storing instructions that, upon execution on a system, cause the system to perform operations comprising:

including, in first code of a first network document, a first link to a second network document, the first network document presenting first media content and being part of a network resource that includes a plurality of network documents, the second network document presenting first information about a first interest and being part of the network resource, the first link included in the first code based at least in part on an automated process indicating a first association between the first media content and the first interest;

sending, to a user device, the first code causing the user device to present the first network document and a selectable option corresponding to the first link;

receiving, from the user device, a request for the second network document based at least in part on a selection of the selectable option; and sending, to the user device, second code of the second network document, the second code including a second link to a third network document, the third network document presenting second information about a first item and being part of the network resource, the second link included in the second code based at least in part on a second association between the first item and the first interest, wherein the automated process includes determining the first association between the first media content and the first interest based at least in part on (i) the second association between the first item and the first interest and (ii) a first relevancy score associated with the first interest and a first item category to which the first item belongs.

14. The one or more non-transitory computer-readable storage media of claim 13, wherein the operations further comprise:

receiving the first media content, wherein the first media content indicates the first item and a second item;

determining, based at least in part on a first query to a first database that stores associations between items and interests, the second association between the first item and the first interest;

determining, based at least in part on a second query to a second database that stores interest and item category relevancy scores, the first relevancy score;

generating the first association between the first media content and the first interest based at least in part on the second association and the first relevancy score; and storing the first association in a third database.

15. The one or more non-transitory computer-readable storage media of claim 14, wherein the operations further comprise:

receiving metadata associated with the first media content, the metadata including keywords describing the first media content, wherein the first query uses at least one of the keywords.

16. The one or more non-transitory computer-readable storage media of claim 14, wherein the operations further comprise:

generating an input to a machine learning model based at least in part on the first media content or metadata associated with the first media content; and determining an output of the machine learning model based at least in part on the input, wherein the output indicates features of the first media content, wherein the first query uses at least one of the features.

17. The one or more non-transitory computer-readable storage media of claim 14, wherein the operations further comprise:

determining that, for each item identified by metadata of the first media content, a corresponding interest has been identified;

determine a number of items that are identified by the metadata and associated with the first interest;

determining a ratio of the number and a total number of all items identified by the metadata;

selecting the first interest from among candidate interests based at least in part on the ratio; and generating the first association based at least in part on the first interest being selected.

18. The one or more non-transitory computer-readable storage media of claim 13, wherein the second network document includes additional media content associated with the first interest and showing a second item or is linked to a second interest.

19. The one or more non-transitory computer-readable storage media of claim 14, wherein the operations further comprise:

determining a classification of the first media content by applying computer vision to the first media content;

determining, based at least in part on a third query to a fourth database that stores second associations between classifications and interests, the first association between the first item and the first interest; and generating the first association between the first media content and the first interest based at least in part on the third query to the fourth database.

20. The one or more non-transitory computer-readable storage media of claim 14, wherein the operations further comprise:

determining, based at least in part on the first query to the first database, the first association between the first item and the first interest and a third association between the first media content and a second interest;

determining, based at least in part on a third query to a fourth database that stores second associations between interests, a positive relationship between the first interest and the second interest; and boosting the first interest and the second interest based at least in part on the positive relationship.

* * * * *